US 10,941,551 B2

United States Patent
Arndt et al.

(10) Patent No.: US 10,941,551 B2
(45) Date of Patent: Mar. 9, 2021

(54) DRAIN VALVE FOR A SANITARY CISTERN

(71) Applicant: Viega Technology GmbH & Co. KG, Attendorn (DE)

(72) Inventors: Johannes Arndt, Attendorn (DE); Gerhard Rothstein, Velbert (DE); Heinz-Werner Wessel, Rettenberg (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 0 days.

(21) Appl. No.: 16/954,598

(22) PCT Filed: Dec. 4, 2018

(86) PCT No.: PCT/EP2018/083394
§ 371 (c)(1),
(2) Date: Jun. 17, 2020

(87) PCT Pub. No.: WO2019/120972
PCT Pub. Date: Jun. 27, 2019

(65) Prior Publication Data
US 2020/0332507 A1    Oct. 22, 2020

(30) Foreign Application Priority Data

Dec. 19, 2017    (DE) ...................... 10 2017 130 585.8

(51) Int. Cl.
*E03D 3/10*    (2006.01)
*E03D 1/14*    (2006.01)
(Continued)

(52) U.S. Cl.
CPC ................. *E03D 3/10* (2013.01); *E03D 1/14* (2013.01); *E03D 1/34* (2013.01); *F16K 31/088* (2013.01)

(58) Field of Classification Search
CPC .... E03D 3/10; E03D 3/00; E03D 1/14; E03D 1/34; E03D 1/30; E03D 1/302;
(Continued)

(56) References Cited

U.S. PATENT DOCUMENTS 815,661 A  *  3/1906  Vissing ................... E03D 1/053
                                                           4/353
1,008,737 A  *  11/1911  Schossow ................. E03D 1/30
                                                           4/384

(Continued)

FOREIGN PATENT DOCUMENTS

CN          1097664 C       1/2003
CN          2693835 Y       4/2005
(Continued)

*Primary Examiner* — Benjamin R Shaw
(74) *Attorney, Agent, or Firm* — The Webb Law Firm

(57) ABSTRACT

The invention relates to a drain valve (1) for a sanitary cistern, in particular a concealed cistern, having a valve housing (2) with a drain opening (4), the drain opening (4) being delimited by a valve seat (6), and a valve body (7), which rests in a sealing manner on the valve seat (6) in the closed state of the drain valve, the valve housing (2) having a housing chamber (11), arranged upstream of the valve seat (6) in the direction of flow, for receiving water. To allow the drain valve to be arranged outside the cistern and to enable access to the drain valve for maintenance as well as removal via an inspection opening that can be covered by a toilet bowl or urinal bowl, the invention suggests that
the valve body (7) is provided with an auxiliary chamber (12) for receiving water, the receiving volume of which is smaller for water in the open state of the drain valve (1) than in the closed state of the drain valve (1), the auxiliary chamber (12) being delimited by a flexible and/or movable wall section, and wherein the auxiliary chamber (12) is associated with an auxiliary drain valve (16) which in a first position permits an inflow of water into the auxiliary cham-
(Continued)

ber (12) and in a second position permits an outflow of water out of the auxiliary chamber (12).

14 Claims, 3 Drawing Sheets

(51) Int. Cl.
*E03D 1/34* (2006.01)
*F16K 31/08* (2006.01)

(58) Field of Classification Search
CPC .. E03D 1/308; E03D 1/36; E03D 1/38; E03D 5/02; F16K 1/126; F16K 31/1226
USPC .......................................................... 4/378
See application file for complete search history.

(56) References Cited

U.S. PATENT DOCUMENTS

| | | | | |
|---|---|---|---|---|
| 2,879,521 A | * | 3/1959 | Brasher | E03D 1/14 4/388 |
| 3,466,673 A | * | 9/1969 | Boccard | E03D 3/02 4/376 |
| 5,136,732 A | * | 8/1992 | Andersson | E03D 3/06 251/144 |
| 5,926,861 A | * | 7/1999 | Frost | E03D 1/34 4/378 |
| 6,470,505 B1 | * | 10/2002 | Boisvert | E03D 3/10 4/322 |
| 2002/0108169 A1 | * | 8/2002 | Preciado-Villanueva | E03D 1/053 4/378 |
| 2012/0151667 A1 | * | 6/2012 | Berry | E03D 1/30 4/406 |
| 2018/0051449 A1 | * | 2/2018 | Guha | E03D 9/16 |
| 2020/0291629 A1 | * | 9/2020 | Usher | E03D 3/10 |

FOREIGN PATENT DOCUMENTS

| | | |
|---|---|---|
| DE | 10315926 A1 | 10/2004 |
| DE | 202007017789 U1 | 4/2009 |
| EP | 0126385 A2 | 11/1984 |
| EP | 2392844 A1 | 12/2011 |
| WO | 03106774 A2 | 12/2003 |

* cited by examiner

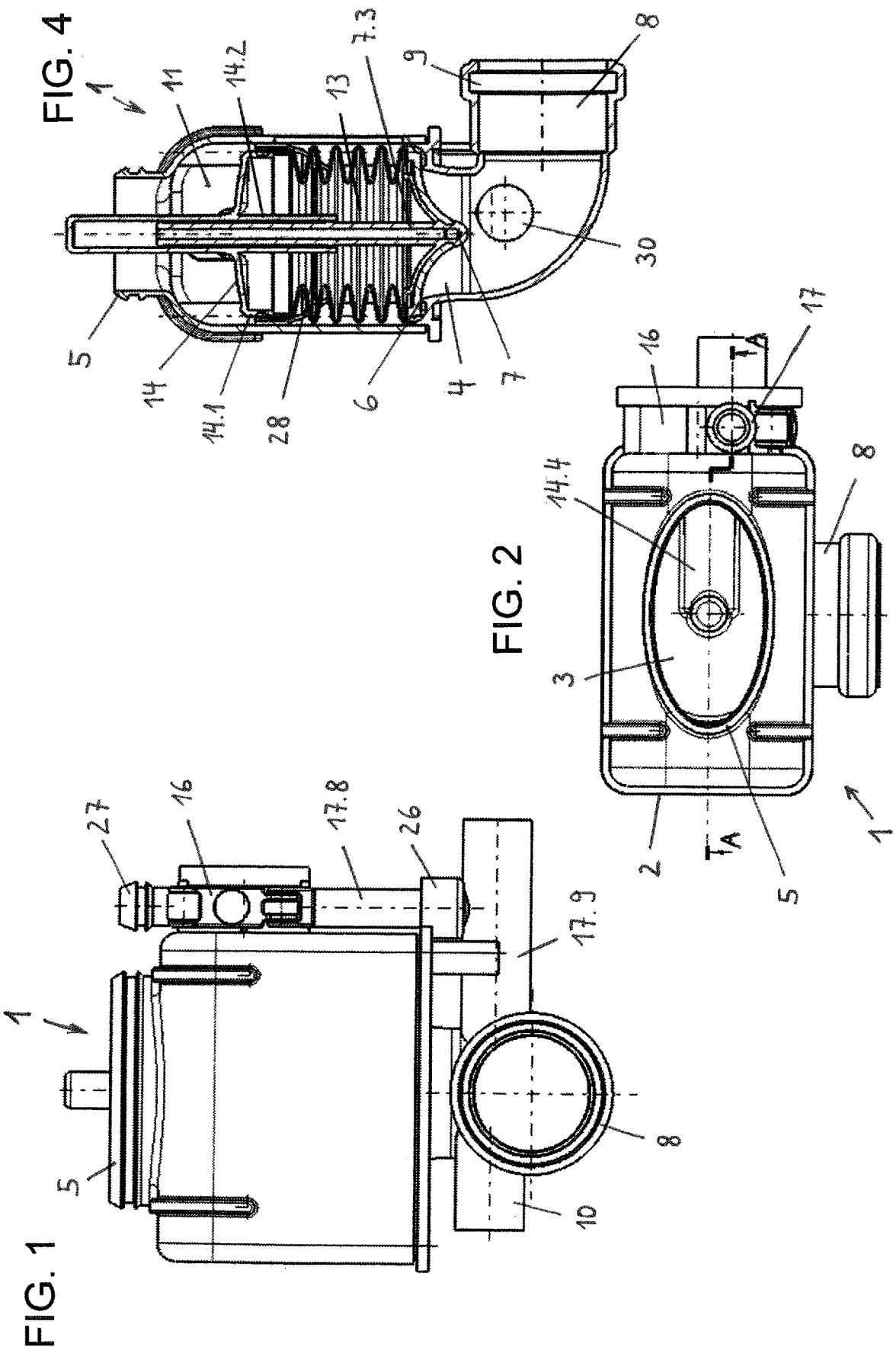

DRAIN VALVE FOR A SANITARY CISTERN

CROSS-REFERENCE TO RELATED APPLICATIONS

This application is the United States national phase of International Application No. PCT/EP2018/083394 filed Dec. 4, 2018, and claims priority to German Patent Application No. 10 2017 130 585.8 filed Dec. 19, 2017, the disclosures of which are hereby incorporated by reference in their entirety.

BACKGROUND OF THE INVENTION

Field of the Invention

The invention relates to a drain valve for a sanitary cistern, in particular a concealed cistern, having a valve housing with a drain opening, the drain opening being delimited by a valve seat, and a valve body, which rests in a sealing manner on the valve seat in the closed state of the drain valve, the valve housing having a housing chamber, arranged upstream of the valve seat in the direction of flow, for receiving water.

Description of Related Art

Cisterns for toilet bowls or urinal bowls are known in various designs. Conventional sanitary cisterns, in particular concealed cisterns, have a cistern body in whose front wall or upper side an inspection opening is formed. Functional parts, such as drain valve and filling valve, are mounted in the cistern body via the inspection opening. The inspection opening is usually combined with an actuating plate, which has one or two movably mounted control buttons to trigger a water flush. For maintenance and repair purposes, the inspection opening allows access to the functional parts mounted in the cistern body.

For aesthetic reasons in particular, the actuating plates of concealed cisterns are regularly made relatively small. Accordingly, the dimensions of the inspection openings are limited. The installation of the functional parts to be arranged in the cistern body is relatively difficult due to the small inspection openings.

In DE 20 2007 017 789 U1, a concealed cistern for a toilet bowl or urinal bowl having a filling valve, a drain valve, a flushing pipe and an electrical actuating device for triggering a flush is proposed, in which a connection space or housing for accommodating an electrical control unit and a water connection with shut-off feature is arranged below the cistern body receiving flushing water, the connection space or housing having on its front side an inspection opening which is dimensioned and arranged in such a way that it is covered by the toilet bowl or urinal bowl after installation of the latter.

The concealed cistern known from DE 20 2007 017 789 U1 is based on the knowledge that the back of a toilet bowl usually covers a considerably larger wall area than a conventional actuating plate assigned to the toilet bowl for triggering a water flush. An inspection opening of a connection space or housing located below the concealed cistern, which can be invisibly covered by the toilet bowl, can therefore be made considerably larger than an inspection opening of a concealed cistern located above the toilet bowl and covered by a conventional actuating plate. The larger inspection opening facilitates the connection and installation of functional parts of the concealed cistern. The concealed cistern does not require any installation work within its cistern body that receives the flushing water for its commissioning. The cistern body can therefore be closed, i.e. without an inspection opening. Accordingly, a standard actuating plate, which covers an inspection opening of the concealed cistern located above the toilet bowl when mounted, can then be omitted. This known concealed cistern thus allows an uninterrupted wall surface design above the toilet bowl, which allows a special design to be achieved. For example, the wall surface above the toilet bowl can now be covered with a continuous wall covering without the wall covering having a cut-out for an otherwise conventional actuator plate.

The concealed cistern known from DE 20 2007 017 789 U1 is not equipped with a mechanical actuating device to trigger a flush. Instead, an electrical actuating device and an electrical control system are provided, by means of which an electrical actuator is operated which opens and closes the drain valve. The drain valve has a ball or a rotatable flap as the valve body.

The present invention is based on the object of creating a drain valve of the aforementioned type which can be arranged outside the cistern and is accessible for its maintenance and removal via an inspection opening which can be covered by a toilet bowl or urinal bowl.

SUMMARY OF THE INVENTION

This object is solved by a drain valve having the features according to the invention. Preferred and advantageous embodiments of the drain valve according to the invention are stated in the subclaims.

The drain valve according to the invention is characterized in that its valve body is provided with an auxiliary chamber for receiving water, the receiving volume of which is smaller for water in the open state of the drain valve than in the closed state of the drain valve. The auxiliary chamber is delimited by a flexible and/or movable wall section. In addition, the auxiliary chamber is assigned an auxiliary drain valve which, in a first position, permits an inflow of water into the auxiliary chamber and, in a second position, permits an outflow of water out of the auxiliary chamber.

The drain valve according to the invention can be arranged outside, in particular below the cistern. Maintenance as well as removal of the drain valve can be carried out via an inspection opening that can be covered by a toilet bowl or urinal bowl. For this purpose, the inspection opening can be arranged in a pre-wall in which the cistern is accommodated in such a way that the drain valve protrudes into the inspection opening after removal of the toilet bowl or urinal bowl, at least with a drain pipe section attached to the valve housing, preferably formed in one piece. The drain valve according to the invention thus offers more or new degrees of freedom in the design of toilet rooms and bathrooms. By controlling the drain valve via the auxiliary drain valve, a smooth operation of the drain valve as well as a reliable function of the drain valve can be achieved.

In addition, the drain valve according to the invention offers the advantage over conventional cistern drain valves that the forces required to actuate the auxiliary drain valve and thus the forces required to actuate the drain valve are relatively low.

The drain valve according to the invention is particularly suitable for an arrangement outside a sanitary cistern; however, it can also be used inside a sanitary cistern.

The chamber for receiving water present in the valve housing of the inventive drain valve, in which the valve body is arranged, can also be described as the main chamber. Accordingly, the valve body located in the main chamber can also be referred to as the main valve body and the valve formed by the valve body and the valve seat assigned to it can be referred to as the main valve. According to the invention, this main valve can be controlled by means of the auxiliary drain valve. For this purpose, the valve body (main valve body) is provided with the auxiliary chamber for receiving water, the water receiving volume of which is smaller in the open state of the main valve than in the closed state of the main valve. The receiving volume of the auxiliary chamber is thus variable. For this purpose, the wall delimiting the auxiliary chamber has a flexible and/or movable wall section which is preferably designed in the form of a bellows. According to another advantageous embodiment, the flexible and/or movable wall section is designed to be shape stabilized. For this purpose, it is provided, for example, with one or more support rings, which move with is and which are preferably arranged on its inner side.

The auxiliary drain valve assigned to the auxiliary chamber is designed in such a way that it allows water to flow into the auxiliary chamber in a first position and water to flow out of the auxiliary chamber in a second position. The water flowing into the auxiliary chamber preferably flows into the auxiliary chamber via the auxiliary drain valve. The water flowing out of the auxiliary chamber preferably also flows out of the auxiliary chamber via the auxiliary drain valve. Compared to the main valve, the auxiliary drain valve can be implemented with relatively small dimensions.

The water flowing into the auxiliary chamber increases its volume so that the valve body (main valve body) connected to the flexible and/or movable wall section of the auxiliary chamber is moved towards the valve seat to close the main valve or drain. In the closed state of the drain, the water pressure in the drain housing chamber (main chamber) and the water pressure in the auxiliary chamber are essentially equal. Since the area of the valve body (main valve body) exposed to the water in the main chamber is smaller than the area of the valve body exposed to the water in the auxiliary chamber, the valve body is pressed against the valve seat, resulting in effective closure of the drain (main valve).

To open the main valve or drain, the auxiliary drain valve, which can also be briefly referred to as the auxiliary valve, is moved to the second position, in which a discharge of water from the auxiliary chamber is released. At the same time, a further inflow of water into the auxiliary chamber is prevented at least to such an extent that the water volume flow out of the auxiliary chamber is greater than the water volume flow into the auxiliary chamber. This reduces the water pressure in the auxiliary chamber compared to the water pressure in the main chamber, with the result that the valve body moves away from the valve seat and the flexible and/or movable wall section of the auxiliary chamber is compressed or pushed into each other.

As mentioned above, the flexible and/or movable wall section of the auxiliary chamber is preferably designed in the form of a bellows. However, instead of a bellows, a roll diaphragm and/or a telescopic wall construction can also be used to realize the flexible and/or movable wall section. The wall segments, which can be telescoped relative to each other, can be connected, for example, by a flexible, annular sealing membrane.

A further preferred embodiment of the invention provides that the auxiliary chamber is partially delimited by a cap-shaped housing portion. The cap-shaped housing portion allows a reliable spatial alignment and definition of the auxiliary chamber within the larger housing chamber of the drain housing. The cap-shaped housing portion of the auxiliary chamber is, for example, manufactured as an injection-moulded part from plastic, preferably hard plastic.

According to a further preferred embodiment of the invention, the cap-shaped housing portion is provided with a sleeve-like collar. With such a collar, a bellows can be reliably connected to the cap-shaped housing portion in a liquid-tight manner, whereby the collar can simultaneously take over a guiding and protective function with respect to the bellows when the latter is compressed during the opening operation of the drain valve.

Another advantageous embodiment of the invention is characterized in that the valve body has a valve rod which is displaceably guided in a sleeve-shaped receptacle connected to an upper wall portion of the auxiliary chamber. In this way a reliable alignment of the valve body with respect to the valve seat can be permanently ensured despite the flexible and/or movable wall section of the auxiliary chamber. The sleeve-shaped receptacle can preferably be held by the cap-shaped section of the housing, for example by making the sleeve-shaped receptacle and the cap-shaped section of the housing in one piece or by joining them together with a material bond.

A further configuration of the invention provides that the valve body has an edge portion which projects laterally beyond the valve seat and, in the closed state of the drain valve, delimits a gap with the bottom of the housing chamber. By means of this gap, the water pressure occurring in the housing chamber (main chamber) can reliably act on an edge surface of the valve body that protrudes laterally beyond the valve seat, in order to ensure that, when water flows out of the auxiliary chamber as a result of appropriate actuation of the auxiliary drain valve, the valve body is lifted from the valve seat and thus the drain valve (main valve) is opened.

In order to achieve a good or high flushing performance, it is advantageous when, according to a further embodiment, the valve body has a flushing water deflection surface which, when the drain valve is in the closed state, projects into the drain opening delimited by the valve seat. The flushing water deflecting surface of the valve body can, for example, be designed in the form of a rotationally symmetrical circumferential concave arc or in the form of a cone.

According to a further embodiment of the invention, the valve housing of the drain valve has a connecting piece designed to connect the drain valve to a flushing pipe socket connected to the cistern or to a flushing pipe connected to the cistern. The connection pipe allows the drain valve to be easily and quickly removed and installed. The connecting piece preferably has an essentially oval or elliptical pipe profile and thus represents a good compromise between installation space requirements and flow characteristics. The connecting piece is preferably provided with a sealing ring which is held in a circumferential groove (annular groove) formed on the connecting piece.

According to a further embodiment of the invention, the auxiliary drain valve of the drain valve according to the invention is arranged in a bypass line, which bridges the drain opening delimited by the valve seat. The bypass line preferably comprises two or more pipe sections which are connected to each other by a liquid-tight plug connection. Corresponding to the valve housing of the drain valve, preferably also the bypass line has a connecting piece which is designed to connect the bypass line to a pipe socket connected to the cistern or to a pipeline connected to the cistern.

In this context, a further embodiment provides for the bypass line to open into a drain pipe section which follows the valve seat in the direction of flow. The water flowing out of the auxiliary chamber when the auxiliary drain valve is actuated accordingly thus enters the drain pipe section. This embodiment further facilitates the disassembly and assembly of the drain valve according to the invention. The drain pipe section can be connected directly or via a transition pipe section to the flushing water connection of a toilet bowl or urinal bowl. Preferably, the drain pipe section is designed in the form of a pipe angle or pipe elbow having a connecting sleeve.

According to a further embodiment of the drain valve according to the invention, the drain pipe section has a connection for an overflow pipe. The overflow pipe and the overflow pipe connection provided on the drain pipe section following the main valve ensure that in the event of an uninterrupted water supply to the cistern, e.g. due to a defect in the filling valve, overflowing of the cistern and thus water damage is prevented.

According to an alternative embodiment of the drain valve according to the invention, the bypass line can have a connection for an overflow pipe instead of the drain pipe section, whereby the overflow pipe connection in this case follows the auxiliary drain valve in the direction of flow.

A further advantageous embodiment of the drain valve according to the invention is characterized in that the auxiliary drain valve has a pivotally mounted valve body which is provided with a magnetic coupling whose mutually attracting coupling elements are arranged on opposite sides of a housing wall of a closed housing which delimits a receiving space of the pivotable valve body of the drain valve. The coupling elements of the magnetic coupling arranged on opposite sides of the closed housing are thus connected to each other without leakage. Thereby a through-opening in the housing wall of the drain valve to be sealed, which serves to allow a movable actuating element, e.g. a shaft or actuating shaft, to pass through, is avoided, thus avoiding the risk of water damage due to a possible defect in the required sealing of the through-opening. As a result, this design ensures leakage-free control of the drain valve.

BRIEF DESCRIPTION OF THE DRAWINGS

In the following, the invention is explained in more detail on the basis of a drawing representing an exemplary embodiment. In the drawing:

FIG. 1 shows a drain valve according to the invention in the closed state, in a front view;
FIG. 2 shows the drain valve from FIG. 1 in a top view;
FIG. 4 shows the drain valve in a sectional view along the section line B-B in FIG. 3.

DESCRIPTION OF THE INVENTION

Figure 3:
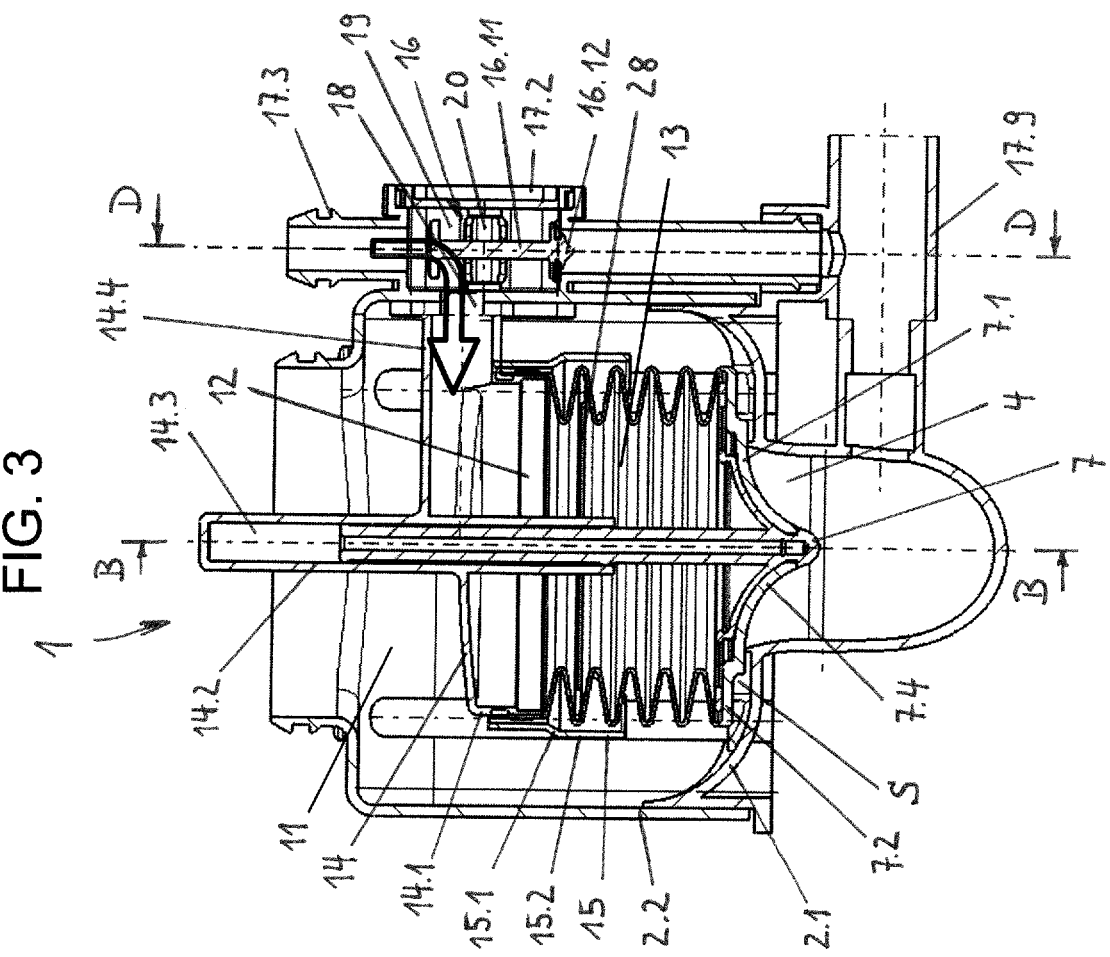
FIG. 3 shows the drain valve in a sectional view along the section line A-A in FIG. 2.
Figure 5:
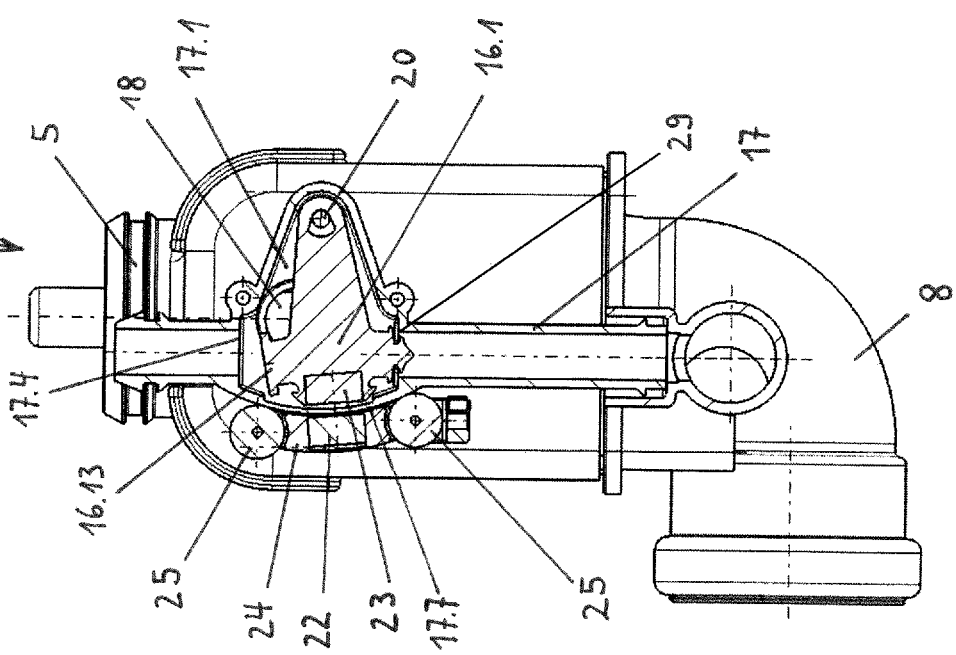
FIG. 5 shows the drain valve in a sectional view along the section line D-D in FIG. 3.

The drain valve 1 shown in the drawing is intended for a combination with a sanitary cistern (not shown), especially a concealed cistern. Conventional drain valves for sanitary cisterns are located inside the cistern and are accessible for maintenance or repair purposes via an inspection opening located above the toilet or urinal bowl.

In contrast thereto, the drain valve 1 according to the invention is designed in such a way that it is arranged in the assembled state below and thus outside the cistern. The drain valve 1 thus enables the inspection opening, which is arranged above the toilet or urinal bowl in conventional concealed cisterns, to be moved to a position behind the toilet or urinal bowl so that the inspection opening is completely covered by the toilet or urinal bowl.

The drain valve 1 has a closed valve housing (drain valve housing) 2, which is provided with an inlet opening 3 and a drain opening 4. The inlet opening 3 is defined by a connecting piece 5, which is preferably located on the top of the valve housing 2. Via the connecting piece 5, the drain valve 1 can be connected to a flushing pipe socket connected to the cistern or to a flushing pipe connected to the cistern.

The drain opening 4 is delimited by a valve seat 6. The valve seat 6 is designed in the form of an annular, preferably circular projection which protrudes slightly into the interior of the valve housing 2. A valve body is designated as 7, which rests sealingly on the valve seat 6 when the drain valve 1 is in the closed state (see FIGS. 3 and 4).

A drain pipe section 8, preferably in the form of a pipe elbow, is connected to the valve seat 6 in the direction of flow. The end of the drain pipe section 8 can be connected directly to the flushing water connection (not shown) of a toilet or urinal bowl. For this purpose, the end of the drain pipe section 8 is designed, for example, in the form of a connection sleeve, which has an annular groove 9 on the inside to accommodate a sealing ring.

Reference number 10 refers to a pipe socket which opens into the drain pipe section 8 and serves as a connection for an overflow pipe (not shown) connected to an overflow opening of the cistern.

The valve housing 2 defines a housing chamber 11 upstream of the valve seat 6 in the direction of flow. The housing chamber 11 serves to accommodate the valve body 7 as well as to receive water. The valve housing 2 is composed of a lower housing part 2.1 and an upper housing part 2.2 which are connected to each other in a liquid-tight manner. The lower housing part 2.1 comprises the drain opening 4 with the valve seat 6 and the drain pipe section 8, while the upper housing part 2.2 comprises the connecting piece 5 with the inlet opening 3. The valve housing 2 is preferably essentially box-shaped, with its front and rear surfaces being significantly wider than its respective side surfaces. The valve housing 2 therefore preferably has an essentially rectangular plan view (see FIG. 2). The connecting piece 5, which is integrally formed on the upper body part 2.2, has a substantially oval or elliptical pipe profile. The main axis of the pipe profile runs parallel to the front side and the back side of the housing part 2.2.

The valve body 7 is provided with an auxiliary chamber 12 to receive water. The auxiliary chamber 12 is partially delimited by a flexible and movable wall section 13, so that its water receiving volume is variable. The flexible and movable wall section 13 is shape stabilized. For this purpose, it has, for example, one or more support rings 28 which move with it and which are arranged on its inner side. In the embodiment shown, the flexible and movable wall section 13 is formed by a bellows. The bellows 13 is made of rubber-elastic material or plastic, for example.

In addition, the auxiliary chamber 12 is partially delimited by a cap-shaped housing portion 14. The cap-shaped housing portion 14 has a collar 14.1 facing the valve seat 6, which collar serves for the liquid-tight connection of the upper end of the bellows 13. In addition, the cap-shaped housing portion 14 is provided with a sleeve-like collar 15. The collar 15 ends at a distance above the valve seat 6. The sleeve-like collar 15 surrounds the upper end of the bellows 13 and is connected to the collar 14.1 of the cap-shaped housing portion 14 directly and/or via the bellows 13. Optionally, the collar 15 has, below its upper connecting section, a transition section 15.1 which is, for example, conically shaped, and a section 15.2 which adjoins the transition section and whose diameter is wider than the diameter of the transition section. The diameter-extended section 15.2 embraces the outside of the bellows 13 with play.

The lower end of the bellows 13 is connected to a plate-shaped section 7.1 of the valve body 7 in a liquid-tight manner. The plate-shaped section 7.1 has an edge section 7.2 which projects laterally beyond the valve seat 6 and, when the drain valve 1 is in the closed state, defines a gap S with the bottom of the housing chamber 2. The edge section 7.2 is axially offset by a few millimeters from the valve body section touching the valve seat 6 (FIG. 3).

Furthermore, the valve body 7 preferably has a valve rod 7.3 which is displaceably guided in a sleeve-shaped receptacle 14.2. The receptacle (guide) 14.2 is connected to the cap-shaped housing portion 14 or the upper wall section of the auxiliary chamber 12. The upper, closed end of the sleeve-shaped guide 14.2 protrudes from the upper side of the cap-shaped housing portion 14 and extends, for example, beyond the connecting piece 5 in the direction of the (not shown) cistern. The lower, open end of the guide 14.2 protrudes into the bellows 13 and preferably ends above the lower edge of the collar 15 (see FIGS. 3 and 6). The cylindrical valve rod 7.3 is preferably tubular and open towards the cavity 14.3 in the sleeve-shaped guide 14.2.

The plate-shaped section 7.1 of the valve body has a flushing water deflection surface 7.4 which, when the drain valve 1 is in the closed state, projects into the drain opening 4 delimited by the valve seat 6. The flushing water deflecting surface 7.4 is here, for example, designed in the form of a rotationally symmetric circumferential concave arc.

An auxiliary drain valve 16 is assigned to the auxiliary chamber 12, which in a first position allows water to flow into the auxiliary chamber 12 and in a second position allows water to flow out of the auxiliary chamber 12. The auxiliary drain valve 16 is arranged in a bypass line 17, which bridges the valve seat 6 and the drain opening 4 located there, respectively. The bypass line 17 is connected on the inlet side to the cistern and opens into the drain pipe section 8, which follows the valve seat 6 in the direction of flow. The opening 30 of the bypass line 17 in the drain pipe section 8 can be seen in FIG. 4.

The auxiliary drain valve 16 contains a valve body 16.1 which is pivotally mounted in a receiving space 17.1 formed in the bypass line 17. The receiving space 17.1, which can also be called valve chamber, is hydraulically connected via a channel or passage 18 with the auxiliary chamber 12. The passage 18 opens into the cap-shaped housing portion 14 of the auxiliary chamber 12 or into a connecting piece 14.4 provided on the cap-shaped housing section, respectively. The bypass line 17 has a liquid-sealing cover 17.2 in the area of the valve chamber 17.1.

The valve body 16.1 of the auxiliary valve 16 has a relatively thin web-shaped lever section 16.11, which is spaced on both sides of the valve chamber wall or the cap 17.2, respectively, and thus delimits water passages 19. At its end facing away from the swivel axis 20, the valve body 16.1 is provided with a lower or first valve head 16.12, which, in a closed position of the auxiliary valve 16, shuts off the bypass line 17 in such a way that water flowing from the cistern via the upper bypass line section 17.3 into the valve chamber 17.1 flows into the auxiliary chamber 12. Furthermore, the valve body 16.1 is provided at its end facing away from the swivel axis 20 with an upper or second valve head 16.13, which, in an open position of the auxiliary valve 16, closes the inlet opening 17.4 of the valve chamber 17.1 so that water flowing out of the auxiliary chamber 12 does not flow into the upper bypass line section 17.3 but into the outlet opening 17.5 of the valve chamber 17.1 and thus into the lower bypass line section 17.6. The lower or first valve head 16.12 is preferably provided with a rubber-elastic ring seal 29. The upper or second valve head 16.13 does not require such a seal.

The valve body 16.1 of the auxiliary valve 16 is provided with a magnetic coupling 21. The mutually attracting elements 22, 23 of the magnetic coupling 21 are arranged on opposite sides of a housing wall 17.7, which delimits the receiving space (valve chamber) 17.1 of the valve body 16.1. The housing wall 17.7 is designed in the shape of a circular arc segment. The magnet 22 or a magnetic element arranged outside the receiving chamber 17.1 is attached to a movable slide or carriage 24. Rollers of the carriage 24 are denoted by 25. The magnet 23 or an element attracted by the outer magnet 22 located inside the receiving space 17.1 is attached to the end of the valve body 16.1 which is further away from the swivel axis 20.

Figure 6:
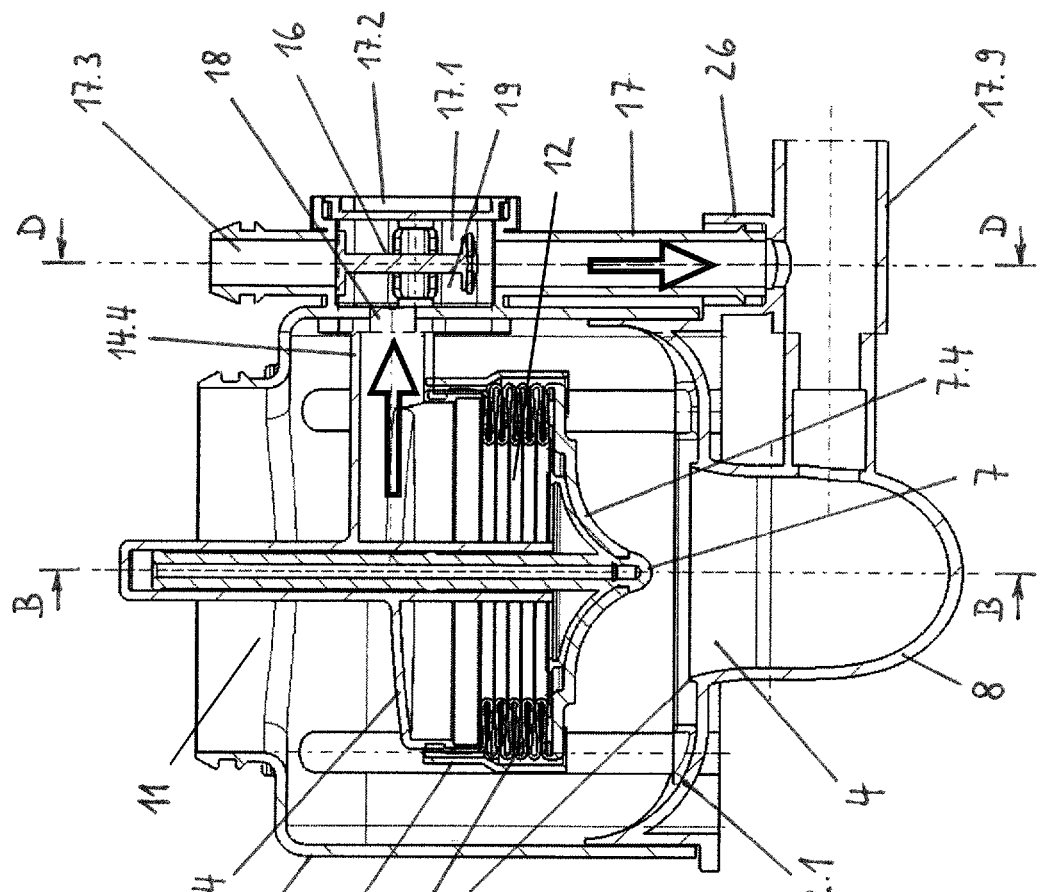
FIG. 6 shows the drain valve in the open state in a sectional view along the section line A-A in FIG. 2.
Figure 7:
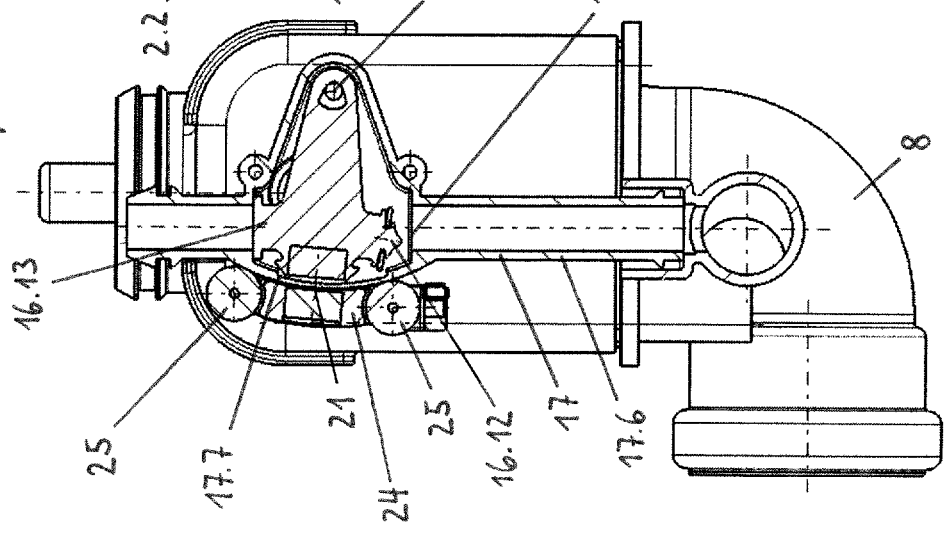
FIG. 7 shows the drain valve in the open state in a sectional view along the section line D-D in FIG. 3.

FIG. 3 shows the position of the auxiliary valve 16 at which water flows into the auxiliary chamber 12. The water flow is indicated by the arrow pointing into the auxiliary chamber 12. In contrast thereto, FIG. 6 shows the position of the auxiliary valve 16 at which water can flow out of the auxiliary chamber 12. The draining of water from the auxiliary chamber 12 is indicated by two arrows.

In the closed state of the drain valve 1 according to FIG. 3, the water pressure in the housing chamber (main chamber) 11 corresponds to the water pressure in the auxiliary chamber 12. The area of the plate-shaped section 7.1 of the valve body 7 exposed to the water pressure in the main chamber 11 is then considerably smaller than the area of the plate-shaped section 7.1 of the valve body exposed to the water pressure in the auxiliary chamber 12. Thus the valve body 7 closes the drain opening 4 (FIG. 3) which is delimited by the valve seat 6.

If now the auxiliary drain valve 16.1 is opened, water flows off from the auxiliary chamber 12 via the bypass line 17. Thereby the water pressure in the auxiliary chamber 12 drops compared to the water pressure in the main chamber 11. The higher water pressure in the main chamber 11 causes a lifting of the valve body 7 from the valve seat 6 and in connection therewith a compression of the bellows 13 (FIG. 6).

The bypass line 17 preferably comprises two pipe sections 17.8, 17.9 which are connected to each other by a liquid-tight plug connection 26. A first pipe section 17.8 of the bypass line 17 is preferably connected in one piece or by material bonding, respectively, to the upper housing part 2.2 of the drain valve 1 and contains the auxiliary drain valve 16. The pipe section 17.8 is provided on the inlet side with a plug connection 27. The second pipe section 17.9 of the bypass line, which opens into the drain pipe section 8, is connected to the lower housing part 2.1. The liquid-tight plug connection 26 comprises a sleeve-shaped connection which is formed or moulded onto the outside of the second pipe section 17.9. The pipe axes of the two pipe sections 17.8, 17.9 of the bypass line 17 run transversely, preferably essentially at a right angle to each other.

The implementation of the drain valve according to the invention is not limited to the exemplary embodiment shown in the drawing. Rather, numerous variants are conceivable which, even if the design deviates from the example, make use of the invention disclosed in the claims.

The invention claimed is:

1. A drain valve for a sanitary cistern, in particular a concealed cistern, having a valve housing with a drain opening, the drain opening being delimited by a valve seat, and a valve body, which rests in a sealing manner on the valve seat in the closed state of the drain valve, the valve housing having a housing chamber, arranged upstream of the valve seat in the direction of flow, for receiving water, wherein the valve body is arranged in the housing chamber, characterized in that the valve housing has a connecting piece which is designed to connect the drain valve to a flushing pipe socket connected to the cistern or to a flushing pipe connected to the cistern, and in that the valve body is provided with an auxiliary chamber or receiving water, the receiving volume of which is smaller for water in the open state of the drain valve than in the closed state of the drain valve, the auxiliary chamber being delimited by a flexible and/or movable wall section, wherein the valve body is connected with flexible and/or movable wall section of the auxiliary chamber, and wherein the auxiliary chamber is associated with an auxiliary drain valve which in a first position permits an inflow of water into the auxiliary chamber and in a second position permits an outflow of water out of the auxiliary chamber.

2. The drain valve according to claim 1, characterized in that the flexible and/or movable wall portion of the auxiliary chamber is designed in the form of a bellows.

3. The drain valve according to claim 1, characterized in that the auxiliary chamber is partially delimited by a cap-shaped housing portion.

4. The drain valve according to claim 3, characterized in that the cap-shaped housing portion is provided with a collar in the form of a sleeve.

5. The drain valve according to claim 4, characterized in that the valve body has a valve rod which is displaceably guided in a sleeve-shaped receptacle which is connected to an upper wall section of the auxiliary chamber.

6. The drain valve according to claim 5, characterized in that the sleeve-shaped receptacle is held by the cap-shaped housing portion.

7. The drain valve according to claim 1, characterized in that the valve body has an edge portion which projects laterally beyond the valve seat and, in the closed state of the drain valve, delimits a gap with the bottom of the housing chamber.

8. The drain valve according to claim 1, characterized in that the valve body has a flushing water deflecting surface which, in the closed state of the drain valve, projects into the drain opening delimited by the valve seat.

9. The drain valve according to claim 1, characterized in that the auxiliary drain valve is arranged in a bypass line) which bridges the drain opening delimited by the valve seat.

10. The drain valve according to claim 9, characterized in that the bypass line opens into a drain pipe section which follows the valve seat in the direction of flow.

11. The drain valve according to claim 10, characterized in that the drain pipe section has a connection for an overflow pipe.

12. The drain valve according to claim 9, characterized in that the bypass line has a connection for an overflow pipe which follows the auxiliary drain valve in the direction of flow.

13. The drain valve according to claim 1, characterized in that the auxiliary drain valve has a pivotally mounted valve body which is provided with a magnetic coupling whose mutually attracting coupling elements are arranged on opposite sides of a housing wall of a closed housing which delimits a receiving space of the pivotable valve body.

14. The drain valve according to claim 1, characterized in that the flexible and/or movable wall section of the auxiliary chamber is provided with one or more support rings which move with it and which are preferably arranged on its inner side.

* * * * *